Sept. 24, 1946.  R. H. SAGER  2,408,273

SUNSHADE AND OTHER AUXILIARY SPECTACLES

Filed Jan. 5, 1944

INVENTOR:
ROBERT H. SAGER

BY Fay, Gobrick, Chilton & Isler
ATTORNEYS.

Patented Sept. 24, 1946

2,408,273

UNITED STATES PATENT OFFICE 2,408,273

SUNSHADE AND OTHER AUXILIARY SPECTACLES

Robert H. Sager, University Heights, Ohio

Application January 5, 1944, Serial No. 517,014

10 Claims. (Cl. 88—41)

This invention relates, as indicated, to sunshade and other auxiliary spectacles, but has reference more particularly to means for attaching such spectacles to primary spectacles.

A primary object of the invention is to provide auxiliary spectacles of the character described which can be removed and replaced with great facility, and which, when in position, exert no appreciable stresses on the primary spectacles.

Another object of the invention is to provide auxiliary spectacles of the character described, in which the means of attachment to the primary spectacles consists of a minimum number of parts which can be quickly and easily manufactured and assembled into units, which units can be readily mounted on or removed from the auxiliary spectacles and can be easily disassembled for repair or replacement purposes, and which, when mounted on the auxiliary spectacles, are substantially concealed from the view of an observer.

A further object of the invention is to provide auxiliary spectacles of the character described, in which the means of attachment to the primary spectacles are frictionally connected with the auxiliary spectacles and hence can be manually removed therefrom or connected thereto.

Other objects and advantages of the invention will be apparent during the course of the following description.

In the accompanying drawing forming a part of this specification, and in which like numerals are employed to designate like parts throughout the same Fig. 1 is a front elevational view of sunshade spectacles embodying my invention, and showing the spectacles mounted on a pair of primary spectacles;

Figure 1:
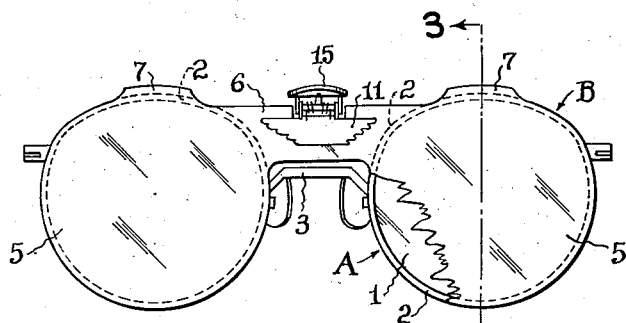

Referring more particularly to the drawing, A designates the primary spectacles to which the anti-glare or sunshade spectacles B are adapted to be detachably secured.

The spectacles A comprise a pair of lenses 1, mounted on rims 2, which are connected by a nose bridge 3, and hinged to which are temples 4.

The anti-glare or sunshade spectacles are preferably formed from a single piece of plastic of any desired color and comprising a pair of lenses 5, which are connected by means of a bridge 6. The lenses 5 are provided at their upper edges with rearwardly extending flanges or clips 7, formed integrally with the lenses, these clips serving a purpose to be presently described.

The bridge 6 has a rectangular notch or recess 8 formed in its upper edge, said notch being defined by a bottom 9 and spaced sides or side walls 10. This recess serves to receive portions of the means or unit whereby the auxiliary spectacles may be detachably secured to or mounted on the primary spectacles.

Figure 4:
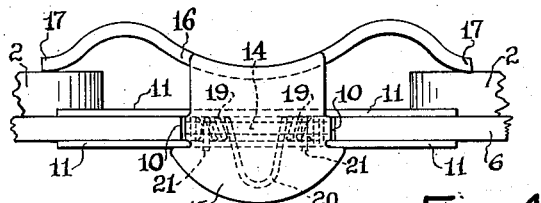
Fig. 4 is a view, on an enlarged scale, of a portion of Fig. 2.
Figure 5:
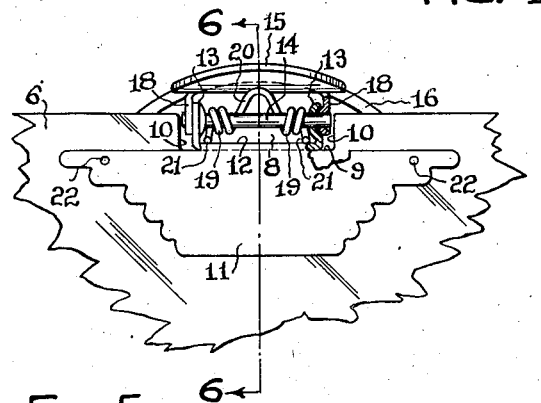
Fig. 5 is a view, on an enlarged scale, of a portion of Fig. 1.
Figure 6:
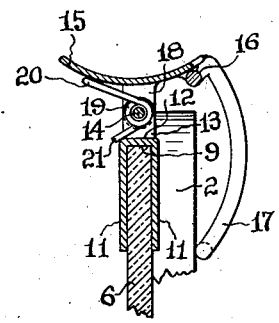
Fig. 6 is a vertical cross-sectional view, taken on the line 6—6 of Fig. 5.

Such means is best illustrated in Figs. 4, 5 and 6, and comprises, in this instance, four distinct elements. One of these elements is in the form of a metallic stamping which is bent to provide two parallel portions 11, which are spaced apart a distance substantially equal to the thickness of the bridge 6, a portion 12 which interconnects the portions 11 and is normally disposed in engagement with the bottom 9 of the recess 8, and which is somewhat shorter than the length of such recess, and a pair of upstanding lugs or ears 13, disposed at the ends of the portion 12, and extending slightly above the upper edge of the bridge 6, said ears forming bearings for a shaft or pin 14. For purposes of appearance, the portions 11 will be shaped to conform to the contour of the bridge 6, and may have the contour of a pair of wings, as shown. The shaft or pin 14 forms the second element of the attachment unit or means.

The third element of such unit comprises a metallic stamping which overlies the bridge 6 and is shaped to provide a curved finger piece 15, to the rear edge of which a wire 16 is soldered, welded or otherwise secured, such wire being shaped to provide a pair of spaced downwardly extending clamping arms 17, the lower ends of which are adapted to engage the rear faces of the lenses 1 to thereby clamp the sunshade spectacles to the primary spectacles. The finger piece 15 is provided at its sides with a pair of downturned lugs or ears 18, which are in pivotal engagement with the ends of the shaft 14, and are disposed on the outboard sides of the ears 13, being substantially in engagement with the latter.

For the purpose of facilitating assembly of the supporting element 11—12—13 and the thumb piece 15, the ears 18 and 13 are preferably concaved so as to permit nesting of the ears 18 in the ears 13. This concaving of the ears 18 and 13 is also of advantage in that it provides a better bearing for the shaft 14, that is, a bearing from which the shaft is less likely to be displaced during the handling of the attachment unit, or in the course of handling or wear of the sunshade spectacles.

Figure 3:
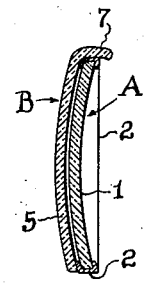
Fig. 3 is a vertical cross-sectional view taken on the line 3—3 of Fig. 1.
Figure 2:
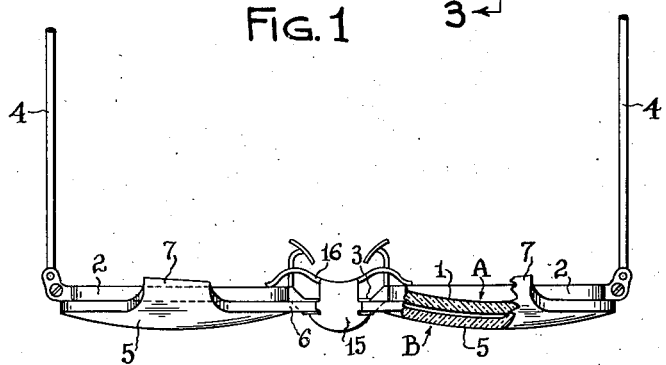
Fig. 2 is a top plan view of the primary and sunshade spectacles shown in Fig. 1, with portions of each broken away to more clearly show the relationship thereof.

For the purpose of normally biasing the clamping arms 17 to the position in which they clamp the sunshade spectacles to the primary spectacles, that is, in the position shown in Figs. 1, 2 and 3, a spring is provided, which constitutes the fourth element of the attachment unit and consists of spaced coil portions 19 connected by a U-shaped portion 20, which bears against the underside of the forwardly projecting portion of the finger piece 15, and ends 21 which bear on the portion 12 of the supporting element 11—12—13. The coil portions, as best shown in Figs. 5 and 6, encircle the shaft or pin 14.

In removing the sunshade spectacles from the primary spectacles, the upper surface of one of the clips 7 is engaged by the index finger of one hand and the lower edge of the lens 5 which bears such clip is engaged by the thumb, and the finger piece 15 is depressed by the central finger, thereby causing the clamping arms 17 to be moved in a counterclockwise direction, as viewed in Fig. 6, to a position in which the sunshade spectacles may be lifted from the primary spectacles. In replacing the sunshade spectacles, the finger piece 15 is first depressed, the sunshade spectacles placed in position over the primary spectacles, and the finger piece released, causing the clamping arms to engage the primary spectacles. As seen in Fig. 3, the clips 7 rest on the frames 2 and serve to balance the sunshade spectacles on the primary spectacles. This is the sole function of the clips, and they do not, in any way, serve as clamping members, as in sunshade spectacles now on the market.

It will be noted that the shaft 14 is disposed below the level of the upper edge of the bridge 6, and that the shaft is substantially the same length as the length of the recess 8. In this manner, the shaft is maintained in position and against axial displacement by the side walls 10 of the recess. By thus positioning the shaft, the other parts of the unit, i. e., the ears 13 and 18 and the spring 19—20—21 are also maintained against displacement by such side walls. Another advantage of disposing the ears 13 and 18 and the spring 19—20—21 below the level of the upper edge of the bridge 6 and substantially within the confines of the recess is that these parts are protected from being brushed against or snagging on the wearer's clothing. In addition to the foregoing advantages, the overall height of the sunshade spectacles is reduced to a minimum, and the parts can be readily disassembled for repair or replacement purposes.

It will be understood, however, that the recess 8 may be eliminated, in which case, the parts in question will be disposed above the upper edge of the bridge 6. In that event, the ends of the shaft 14 will be peened over to prevent axial displacement thereof.

It will be noted that the portions 11 of the supporting element are frictionally interengaged with the bridge 6. Normally, this will be all that is required for the purpose of attaching the attachment unit to the sunshade spectacles. If desired, however, these portions may be provided with perforations 22, through which rivets may be inserted for the purpose of permanently securing the unit to the spectacles.

It will be further noted that the sunshade spectacles can be removed and replaced with great facility, and by the use of only one hand, as contrasted with the use of both hands in removing and replacing sun glasses of known types, and that when the sunshade spectacles are in position they exert no appreciable stresses on the primary spectacles.

It will be further understood that the invention may also be used in connection with spectacles other than sunshade spectacles, as for example in spectacles which are used to supplement primary spectacles, as a substitute for bifocals.

It is to be understood, moreover, that the form of my invention, herewith shown and described, is to be taken as a preferred example of the same, and that various changes in the shape, size and arrangement of parts may be resorted to without departing from the spirit of my invention, or the subjoined claims.

Having thus described my invention, I claim:

1. In a device of the character described, a pair of lenses, a bridge connecting said lenses, said bridge having a recess in its upper edge, said recess having side walls, a shaft disposed in said recess and retained against axial displacement by said side walls, and clamping means pivotally mounted on said shaft, said clamping means adapted for securing said device to a pair of primary spectacles.

2. In a device of the character described, a pair of lenses, a bridge connecting said lenses, said bridge having a recess in its upper edge, a shaft carried by said bridge and disposed in said recess and of a length substantially equal to the length of said recess, whereby said shaft is maintained against axial displacement by the ends of said recess, and a clamp pivotally secured to said shaft, said clamp adapted for securing said device to a pair of primary spectacles.

3. In a device of the character described, a pair of lenses, a bridge connecting said lenses, said bridge having a recess therein, a shaft carried by said bridge and disposed in said recess and of a length substantially equal to the length of said recess, whereby said shaft is maintained against axial displacement by the ends of said recess, and a clamp pivotally movable on the axis of said shaft, said clamp adapted for securing said device to a pair of primary spectacles.

4. In a device of the character described, a pair of lenses, a bridge connecting said lenses, an element frictionally secured to said bridge and having upstanding ears, a shaft mounted in said ears, a clamping element having ears secured to said shaft and pivotally movable about the axis of said shaft, and a coil spring having portions coiled about said shaft, a portion engaging said clamping element, and portions engaging said first-named element, said spring tending to normally urge said clamping element towards said bridge.

5. In a device of the character described, a pair of lenses, a bridge connecting said lenses, said bridge having a recess therein having side walls, an element frictionally secured to said bridge and having a portion disposed in said recess adjacent the bottom of the recess, said portion having a pair of spaced upstanding ears disposed in said recess, a shaft mounted in said ears and maintained against axial displacement by said side walls, and a clamp having ears secured to said shaft and pivotally movable about the axis of said shaft.

6. A device as defined in claim 5 in which the ears of said clamp and element are concaved, with the ears of the clamp nested within the ears of said element.

7. In a device of the character described, a pair of lenses, a bridge connecting said lenses, an element secured to said bridge and having upstanding ears, a shaft mounted in said ears, a clamping element having ears secured to said shaft and pivotally movable about the axis of said shaft, and a coil spring having portions coiled about said shaft, a portion engaging said clamping element, and portions engaging said first-named element, said spring tending to normally urge said clamping element towards said bridge.

8. In a device of the character described, a pair of lenses, a bridge connecting said lenses, said bridge having a recess therein having side walls, an element secured to said bridge and having a portion disposed in said recess adjacent the bottom of the recess, said portion having a pair of spaced upstanding ears disposed in said recess, a shaft mounted in said ears and maintained against axial displacement by said side walls, and a clamp having ears secured to said shaft and pivotally movable about the axis of said shaft.

9. A device as defined in claim 8 in which the ears of said clamp and element are concaved, with the ears of the clamp nested within the ears of said element.

10. In a device of the character described, a pair of lenses, a bridge connecting said lenses, said bridge having a recess therein, an element secured to said bridge and having a portion disposed in said recess, said portion having upstanding ears disposed in said recess, a shaft mounted in said ears and maintained against axial displacement by said side walls, and a clamp mounted on said shaft and pivotally movable about the axis of said shaft.

ROBERT H. SAGER.